United States Patent
Cohn et al.

(10) Patent No.: US 6,655,324 B2
(45) Date of Patent: Dec. 2, 2003

(54) HIGH COMPRESSION RATIO, HYDROGEN ENHANCED GASOLINE ENGINE SYSTEM

(75) Inventors: Daniel R. Cohn, Chestnut Hill, MA (US); Leslie Bromberg, Sharon, MA (US); Alexander Rabinovich, Swampscott, MA (US); John B. Heywood, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 94 days.

(21) Appl. No.: 09/990,910

(22) Filed: Nov. 14, 2001

(65) Prior Publication Data

US 2003/0089337 A1 May 15, 2003

(51) Int. Cl.$^7$ .......................... F02B 43/10; F02B 47/08
(52) U.S. Cl. .................. 123/1 A; 123/304; 123/431; 123/568.11; 123/DIG. 12
(58) Field of Search ................. 123/1 A, 3, 295, 123/304, 431, 435, 568.11, 568.21, DIG. 12

(56) References Cited

U.S. PATENT DOCUMENTS

| | | | | |
|---|---|---|---|---|
| 4,362,137 A | * | 12/1982 | O'Hara | 123/295 |
| 5,139,002 A | * | 8/1992 | Lynch et al. | 123/DIG. 12 X |
| 5,437,250 A | * | 8/1995 | Rabinovich et al. | 123/3 |
| 5,546,902 A | * | 8/1996 | Paluch et al. | 123/304 |
| 5,660,602 A | | 8/1997 | Collier, Jr. et al. | 48/127.3 |
| 5,666,923 A | | 9/1997 | Collier, Jr. et al. | 123/488 |
| 5,787,864 A | | 8/1998 | Collier, Jr. et al. | 123/492 |
| 5,887,554 A | * | 3/1999 | Cohn et al. | 123/3 |

OTHER PUBLICATIONS

"A Gasoline Engine Concept for Improved Fuel Economy—The Lean Boost System" by J. Stokes, T. H. Lake, and R. J. Osborne, International Fall Fuels and Lubricants Meeting and Exposition, Baltimore, MD, Oct. 16–19, 2000 (SAE Technical Paper Series, 14 pages).

* cited by examiner

*Primary Examiner*—Tony M. Argenbright
(74) *Attorney, Agent, or Firm*—Choate, Hall & Stewart (57) ABSTRACT

A hydrogen enhanced gasoline engine system using high compression ratio is optimized to minimize NOx emissions, exhaust aftertreatment catalyst requirements, hydrogen requirements, engine efficiency and cost. In one mode of operation the engine is operated very lean (equivalence ratio $\varnothing=0.4$ to 0.7) at lower levels of power. Very lean operation reduces NOx to very low levels. A control system is used to increase equivalence ratio at increased torque or power requirements while avoiding the knock that would be produced by high compression ratio operation. The increased equivalence ratio reduces the amount of hydrogen required to extend the lean limit in order to avoid misfire and increases torque and power. The engine may be naturally aspirated, turbocharged, or supercharged.

42 Claims, 6 Drawing Sheets

HIGH COMPRESSION RATIO, HYDROGEN ENHANCED GASOLINE ENGINE SYSTEM

BACKGROUND OF THE INVENTION

This invention relates to an engine system and more particularly to a gasoline engine system employing hydrogen enhanced operation.

Hydrogen addition can be used to reduce pollution (especially NOx) from vehicles with spark ignition engines using gasoline and other fuels. Hydrogen can be produced by onboard conversion of a fraction of gasoline or other primary fuel into hydrogen rich gas ($H_2$+CO) by partial oxidation in compact onboard devices suitable for vehicle applications. (See for example, Rabinovich, Bromberg, and Cohn 1995 U.S. Pat. No. 5,437,250 which discussed a plasmatron fuel converter device the contents of which are incorporated herein by reference). The very lean operation (very low fuel-to-air ratio) made possible by combustion of the hydrogen along with the gasoline results in significantly lower nitrogen oxide (NOx) emissions. Hydrogen addition allows for leaner operation without misfire (an unacceptably large fraction of failed ignitions) than would otherwise be possible. The allowed reduction in fuel/air ratio without misfire increases with increasing hydrogen addition. NOx emissions decrease strongly with decreasing fuel/air ratio. Very lean operation also provides higher engine efficiency. However, the increase in net efficiency is reduced by the energy loss in the gasoline-to-hydrogen conversion process. The increase in net efficiency is relatively modest in gasoline engines using conventional compression ratios (9–10.5).

Hydrogen addition can also be used to allow operation with larger amounts of engine gas recirculation (EGR) without misfire than would otherwise be possible. Increased values of EGR reduce in-cylinder burnt gas temperatures and thereby decrease NOx emissions. Operation with heavy EGR at conventional stoichiometric fuel/air mixtures (where the fuel/air ratio is sufficiently high so that there is no excess air over that needed for complete combustion) can result in substantial decreases in NOx. At a stoichiometric fuel/air ratio, the highly effective 3-way exhaust aftertreatment catalyst can be used for substantial additional NOx reduction. However, in contrast to very lean operation, there is likely to be little, no, or even negative net efficiency gain at conventional compression ratios. The use of hydrogen addition to promote lean operation or heavy EGR has been experimentally studied in conventional compression ratio gasoline engines. (See, for example, M. Greve, et al., 1999 Global Power Train Congress, Oct. 5–7, 1999, Stuttgart, Germany and I. E. Kirwin, et al., SAE Technical Paper 1999-01-2927 (1999)).

The relatively modest efficiency benefits of hydrogen enhanced lean operation at conventional compression ratios can be substantially increased by use of high compression ratio. A conceptual evaluation of high compression ratio, hydrogen enhanced lean burn gasoline engine operation (compression ratio 11 to 16) has shown that high compression ratio operation could more than double the net efficiency increase with net efficiencies gains greater than 20% being possible under some circumstances. (See, for example, Bromberg, et al., Intl. J. of Hydrogen Energy 24, 341–350 the contents of which are incorporated herein by reference). However, high compression ratio gasoline engine systems using hydrogen enhanced lean burn operation have received little attention and use of high compression ratio with hydrogen enhanced EGR for higher efficiency operation does not appear to have even been considered. An important reason for this lack of attention is that in order for high compression ratio, hydrogen enhanced engine systems to be practical, a demanding set of requirements must be met.

An important issue for high compression ratio, hydrogen enhanced gasoline engine operation is the avoidance of knock. Knock, the uncontrolled autoignition of the air/fuel mixture by compression rather than by spark ignition, can damage the engine. Gasoline engines are generally operated at compression ratios of 10.5 or lower in order to avoid knock. A gasoline engine operated at high compression ratio will experience knock if some means of reducing the octane requirement of the engine is not utilized. Knock can, in principle, be avoided by hydrogen enabled very lean operation of the gasoline engine at all times. However, use of very lean operation at higher engine torque and power levels can result in undesirable cost and performance. For a given fuel/air ratio, the amount of hydrogen required to maintain engine operation without misfire will increase with the increasing engine load. If the fuel/air ratio is not increased as the engine power increases, thereby allowing the hydrogen/gasoline ratio needed to prevent misfire to decrease, the hydrogen generation requirements will go up substantially with the increased gasoline flow that is required. The increased hydrogen requirements can increase the size and cost for an onboard gasoline-to-hydrogen fuel converter. Moreover, a vehicle engine that is operated very lean at high power levels would undergo a large reduction in torque and peak horsepower, which are required for rapid acceleration, hill climbing or towing; the amount of fuel in the engine cylinders is lower at lower fuel/air ratios, resulting in lower torque and power. If the engine operates very lean at all times, it will most likely be necessary to compensate for lower torque and peak power by use of a turbocharger or supercharger. Use of such boosting devices can result in a significant cost increase, particularly if large amounts of boost are needed.

Hence, requirements for high compression ratio, hydrogen enhanced lean burn gasoline engines are substantially more demanding than is the case for conventional compression ratio hydrogen enhanced lean burn engines. In conventional compression ratio engines there is no knock problem at any fuel/air ratio from very lean values up to stoichiometric values. Thus, in conventional compression ratio engines, when needed, the fuel/air ratio can be increased to provide higher values of torque and power without producing knock.

Another need for high compression ratio hydrogen enhanced gasoline engines is to minimize NOx emissions for a given amount of hydrogen addition at various levels of power. It is desirable to reduce overall NOx emissions to a level such that the cost and complexity of a lean NOx aftertreatment catalyst can be avoided. High compression operation may increase NOx emissions.

Control systems for hydrogen assisted natural gas engines have been previously considered. Collier, et al. describe a system (U.S. Pat. No. 5,787,864) and a method (U.S. Pat. No. 5,666,923) that uses a variable mixture of natural gas and hydrogen, in an engine that operates at variable air/fuel ratios. Hydrogen addition is used to extend the degree of lean operation at low power while high power operation (for acceleration, merging, climbing) uses near stoichiometric mixtures. A set of sensors is used to monitor for misfire in the natural gas engine. Collier does not consider the effect of knock on the control scenario and sensors are not used to measure knock; natural gas has a higher octane rating than gasoline which reduces the impact of knock at high compression ratio. In addition, natural gas has an inherently leaner combustion limit than gasoline and hydrogen requirements for extending the lean limit can be lower than those for gasoline. Moreover, Collier does not consider ways to minimize NOx emissions for a given amount of hydrogen addition so as to suppress NOx to extremely low levels. Collier also fails to consider the use of EGR for torque and power control and does not take the effect of EGR knock limit into account.

SUMMARY OF THE INVENTION

According to one aspect, the invention is an internal combustion spark-ignition gasoline engine having a compression ratio in the range of 11–16; and a means for introducing into the engine lean fuel/air mixtures including an amount of hydrogen sufficient to prevent misfire at a first equivalence ratio in the range of 0.4–0.7 (where the equivalence ratio is the actual fuel/air ratio divided by the stoichiometric fuel/air ratio) when the engine is operated below a selected torque or power level and introducing into the engine a fuel/air mixture at a second equivalence ratio greater than the first equivalence ratio, when the engine is operated above the selected power or torque level, the second equivalence ratio selected to increase the engine torque and prevent knock. The engine may be naturally aspirated, turbocharged, or supercharged.

A knock sensor may be provided to sense the onset of knock and additional turbulence may be induced in the engine cylinder to improve combustion and prevent knock.

In one embodiment, the spatial positioning of the hydrogen injection in the cylinder is such as to allow lower overall equivalence ratio operation without misfire for a given amount of hydrogen. Increased turbulence or variable turbulence may also be used to allow for lower equivalence ratio operation.

In another aspect, the internal combustion system of the invention includes an internal combustion spark-ignition gasoline engine having a compression ratio in the range of 11–16; and means for introducing into an engine a fuel/air mixture having substantially a stoichiometric ratio, fueled with gasoline along with hydrogen and with exhaust gas recirculation (EGR), the amount of hydrogen determined by the amount necessary to maintain the desired level of EGR without misfire. In a preferred embodiment, a 3-way exhaust aftertreatment catalyst is provided for further NOx reduction. The EGR level can be continually varied during the driving cycle with highest amounts of EGR used at low torque and engine power requirements. The lowest amount of EGR that is used is that which is necessary to prevent knock.

The amount of EGR that can be allowed without misfire for a given amount of hydrogen can be increased by spatially preferred injection of hydrogen into the cylinder, increased turbulence or variable valve timing. Hydrogen injection near the spark plug could improve combustion in a heavy EGR environment.

EGR could also be used in combination with lean operation to insure that the transition from lean to less lean operation occurs with very low NOx generation and to maximize the torque and power available from the engine.

DESCRIPTION OF THE PREFERRED EMBODIMENT

An engine system involving a certain set of hydrogen/gasoline engine fuel-to-air ratios and other parameters is used to optimize conditions for achievement of a given set of goals for overall performance of a high compression ratio ($r_c$=11–16) spark-ignition engine. The hydrogen can be provided by an onboard gasoline-to-hydrogen fuel converter external to the engine, a converter that provides hydrogen internally in the engine block, or by onboard storage of hydrogen that is produced externally to the vehicle. Optimization involves minimization of NOx, fuel consumption, hydrogen requirements and cost. Changes in various parameters are made in response to engine torque or power level, signals from knock sensors, misfire sensors and other inputs.

At lower torque or power levels, which constitute a high fraction of the driving time, very lean operation is used to maximize NOx reduction and engine efficiency. When the engine torque or power level reaches a certain percentage of maximum attainable torque or power, the control system switches to a mode where the fuel-to-air ratio is increased, thereby reducing hydrogen requirements needed to allow lean operation and increasing torque and engine power at a given engine speed. Because the degree of leanness is reduced, NOx will increase and engine efficiency will decrease, but this occurs only during the relatively small fraction of the time that the vehicle operates at higher torque and power levels.

This control feature of increasing the fuel-to-air ratio is based upon the recognition that the knock limit can occur at significantly higher fuel-to-air ratios than the lean limit when the lean limit is extended to lower fuel/air ratios by use of hydrogen. Without the extension of the lean limit by the use of hydrogen, the fuel/air ratios of the lean limit and the knock limit can be quite close. (See J. B. Heywood, Internal Combustion Engine Fundamentals, 1988, pp. 856 the contents of which are incorporated herein by reference). If this control strategy were not used, the fuel-to-air ratio employed would not be the optimum for achieving high torque and power levels and avoiding knock at high compression ratios. Hydrogen throughputs can be minimized and engine power maximized by increasing the fuel-to-air ratio until the knock limit is reached. The amount of hydrogen generation would simultaneously be changed to provide the hydrogen addition needed to operate lean without a misfire.

Increasing the fuel/air ratio can substantially reduce the required hydrogen/gasoline ratio needed to prevent misfire.

Thus, at high engine loads (where the gasoline flow rate can be five times the flow rate at light loads) it may be possible to keep hydrogen generation requirements at levels similar to those in light load operation, thus greatly reducing the requirements for onboard hydrogen generation equipment.

During light load operation (which occurs during a high fraction of the driving time), operation in a very lean mode (the equivalence ratio, ø, can vary from 0.4 to 0.7, where ø=(actual fuel/air ratio)/(stoichiometric fuel/air ratio)) can lead to a substantial reduction of NOx relative to stoichiometric operation. Greater than a 97% reduction, thereby suppressing NOx emissions to very low levels, can be readily obtained and preferably a 99% NOx reduction can be achieved by operation in the lower equivalence ratio end of the range. By suppressing NOx to very low levels, the need for a lean NOx exhaust aftertreatment catalyst, which can add considerable expense and complexity, is reduced and may be removed entirely.

Overall efficiency is maximized by keeping the hydrogen/gasoline ratio as low as possible and thus minimizing the fraction of gasoline that must be converted into hydrogen rich gas to a moderate fraction. If a high fraction of the gasoline is converted into hydrogen, conversion losses can have a strong effect on overall efficiency.

Increased turbulence in the cylinder can be used to reduce the hydrogen required to operate at a given value of ø without misfire. This capability can be used to make possible operation at a lower value of ø, with corresponding lower NOx generation, for a given hydrogen/gasoline ratio. It is well known that turbulence improves the combustion characteristics of air/fuel mixtures. The use of additional turbulence in the cylinder can therefore decrease the required amount of hydrogen for avoiding misfire. Additional turbulence can be provided by geometry of the piston/cylinder head, or by charge induction. Variable valve timing and lift can also be used to provide turbulence when it is needed. Additional turbulence at all load conditions may be undesirable due to increased losses to the walls, which can decrease the efficiency of the engine. An alternative option for reducing the hydrogen addition requirements needed for achieving lean operation is to inject the hydrogen rich gas into the engine in such a way as to induce additional turbulence.

Another approach to reduce hydrogen required to avoid misfire at a given ø is to stratify the hydrogen injection. Combustion duration can be dominated by initiation of flame propagation. Burning of the first 10% of the fuel takes a longer time than burning of the next 90% of the fuel. In operation when the fuel is homogeneously mixed with the air, it is possible to dramatically decrease the flame development time (initial burn of 10% of the fuel) if the hydrogen is inhomogeneously injected into the cylinder. If the hydrogen injection is stratified, with a large fraction close to the spark, the required amount of hydrogen addition could be substantially decreased. This approach could also be used in engines with standard compression ratios.

When the required torque or power level increases to a selected value, the control is activated to increase ø. As a result, the torque and power of the engine increase at a given engine speed since there is more fuel for a given amount of air. In one mode of operation, when ø is increased to a value such that it is just below that at which knock occurs, the amount of hydrogen is varied so as to insure that misfire does not occur at the new value of ø. Another possible operation mode is to fix the amount of hydrogen generation above a certain load level, with the level of hydrogen sufficient at all torque or power levels to make possible sufficiently lean operation to prevent knock without misfire.

The highest value of equivalence ratio at which knock does not occur may be increased by adding turbulence (see J. B. Heywood, Internal Combustion Engine Fundamentals 1988, p. 856). Turbulence can be added only at higher torque and power levels in order to minimize adverse effects on engine efficiency.

The significant difference between the very low equivalence ratio misfire limit enabled by the use of hydrogen (at which there is very low NOx generation) and the maximum equivalence ratio without the occurrence of knock can allow for a substantial increase in torque and power when required. For example, operation at an equivalence ratio between 0.4 and 0.55 could reduce NOx generation by at least 98% and preferably 99%, and ø could be increased for a small fraction of time to a value in the range of 0.6 to 0.8, thereby increasing torque and power by up to a factor of two at constant engine speed. The rate of increase to the highest equivalence ratio range could be varied according to requirements for engine system optimization.

The point at which the value of ø will be increased and the value of ø in the high power region will depend upon the NOx emission control strategy in the high power region. If NOx emissions from the vehicle are relatively high after ø has been increased, it may be necessary to limit the operating time in this region to a small fraction of the total driving time in order to keep the overall NOx level down.

An option for minimizing NOx emissions at high torque or power levels in a lean burn engine is to switch to use of engine gas recirculation (EGR) at these power levels. The equivalence ratio can be increased to substantially 1 (stoichiometric operation). At ø=1, a 3-way exhaust aftertreatment catalyst becomes very effective in reducing NOx. Operation with ø slightly greater than 1 may be used. Operation with ø slightly above 1 is used in present vehicles to keep the catalyst cool. An important advantage of using EGR is that it, in contrast to lean operation, can be used in conjunction with a 3-way catalyst. The use of EGR to prevent knock may be hampered by the high temperature of the recirculated gas; cooling of this gas may be required prior to injection into the engine.

In one mode of operation, EGR is used to smooth the transition from very lean low power operation to high power operation with a stoichiometric fuel/air mixture. The presence of EGR suppresses NOx as the equivalence ratio is raised. At the highest power levels the equivalence ratio is set at one, allowing a larger decrease in NOx through use of a 3-way catalyst. In this way, vehicle NOx emissions are suppressed to very low levels at all levels of engine power.

Figure 7:
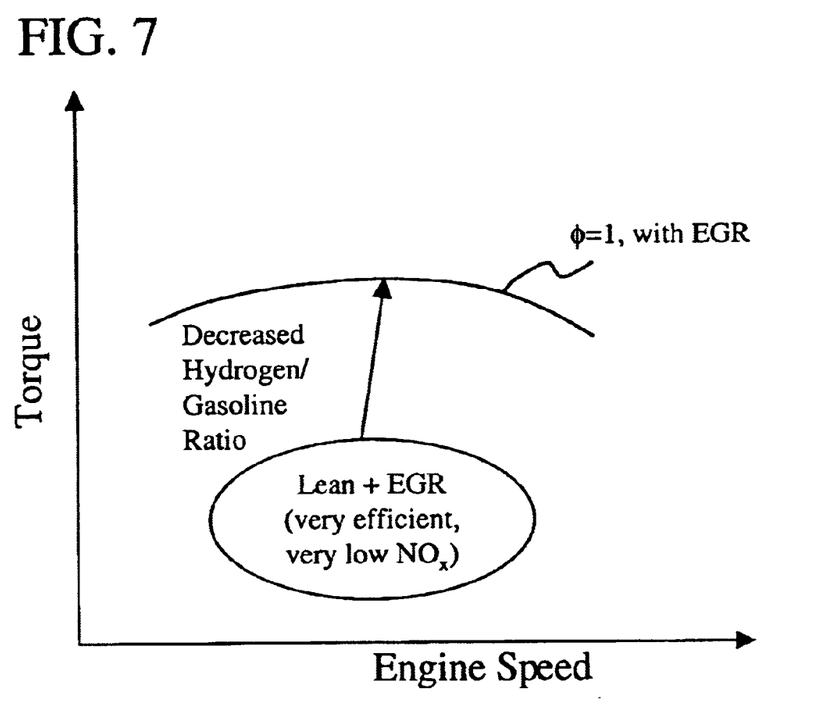
FIG. 7 is a graph showing lean burn engine characteristics as a function of torque and speed for conditions with use of EGR at all torque or power levels.

Alternatively, a combination of EGR and lean burn could be used at light loads as well as at higher loads, as shown in FIG. 7. Use of EGR with lean operation at light loads can provide greater flexibility in varying the equivalence ratio in the transition to higher torque and power levels. The equivalence ratio could then be varied up to a value of 1 with NOx suppressed to low values and knock prevented by the presence of EGR. The presence of EGR at light loads can ensure that rapid increases in EGR do not necessarily have to accompany rapid increases in the equivalence ratio. The amount of hydrogen used would be determined by the level needed to prevent misfire.

Stoichiometric fuel/air mixture operation with no EGR will maximize engine power. If no EGR is used, knock may be avoided by use of a variable compression ratio engine which reduces the compression ratio at high power.

However, the use of variable compression ratio can significantly increase complexity and cost.

The high compression ratio gasoline engine using hydrogen enhanced operation can be operated in either a naturally aspirated or boosted (supercharged or turbocharged) mode. It may be desirable to add boosting to provide torque and power control and to increase maximum power capability by increasing the amount of fuel/air mixture in the cylinder.

At conditions of high power in a high compression ratio engine, it may be possible to utilize hydrogen rich gas to prevent knock, with no or less EGR than would otherwise be required. Hydrogen rich gas would have a small effect on the peak power, due to air charge dilution (less air for combustion in the cylinder).

As an alternative to high compression ratio, hydrogen enhanced lean burn operation, high compression ratio, hydrogen enhanced engine gas recirculation (EGR) operation can be used with a stoichiometric fuel/air ratio at all torque and power levels. Using increased levels of EGR increases the heat capacity of the gaseous mixture in the cylinder, thereby reducing the burnt gas temperature and decreasing NOx. Heavy EGR also increases efficiency, although less than very lean operation, by providing more favorable thermodynamic conditions (a more favorable ratio of specific heat and reduced heat losses) and open throttle operation. When used in a high compression ratio hydrogen enhanced engine, use of EGR could provide significant net increases in engine efficiency (e.g., >10%) in contrast to little, no or negative increase in net engine system efficiency at conventional compression ratios.

Sufficient levels of EGR should also allow high compression ratio operation without knock. The increased dilution provided by EGR will reduce the propensity for self-ignition.

As mentioned previously, use of EGR has the advantage of allowing the use of the highly effective 3-way catalyst for NOx reduction by exhaust aftertreatment. This catalyst requires a stoichiometric fuel/air ratio. In regular operation at lower power levels, heavy EGR (e.g., 15–40% engine gas recirculation) can be used in combination with a 3-way exhaust aftertreatment catalyst to reduce NOx to more than 97% and preferably 99% below NOx levels at stoichiometric operation without the use of a 3-way catalyst or EGR.

The use of the 3-way catalyst reduces the amount of dilution required for achieving a given amount of NOx reduction. As a result, higher engine power levels can be achieved at a given RPM for a given amount of NOx than with the case where very lean burn is used. It may also be possible to reduce the hydrogen/gasoline ratios that are required.

Changing EGR levels provides a means to vary torque and power over a wide operating range and provide high powers with minimum reduction due to dilution.

For a given amount of hydrogen addition, greater levels of EGR and thus greater NOx reduction may be achieved by injecting the hydrogen close to the spark plug, or by creating additional turbulence as is the case with lean burn. During the small fraction of the time that the engine operates at high power, EGR levels can be reduced to levels which are sufficient to prevent knock. Thus, higher powers at a given RPM and reduced hydrogen requirements can be realized.

It may be useful to cool the recirculated engine gas before it is used in the cylinder. Cooling increases the number of gas molecules that can be provided at a given temperature and also mitigates the propensity for knock that could be created by higher temperatures. Both naturally aspirated and boosted engines may be used with hydrogen enhanced EGR operation.

The high compression ratio, hydrogen enhanced engine operating modes described for hydrogen/gasoline mixtures can be applied to the use of other mixtures involving natural gas, propane, ethanol and methanol.

Figure 1:
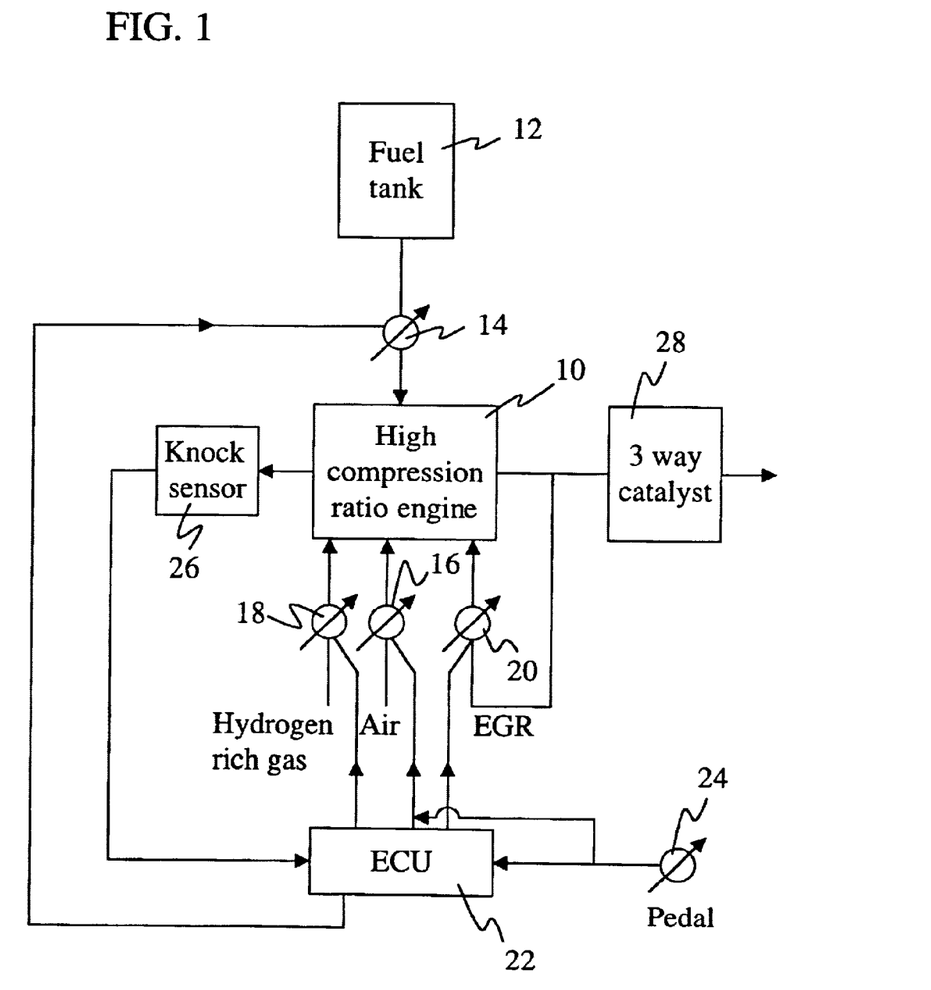
FIG. 1 is a schematic diagram of a high compression ratio engine system that has individually controlled inputs of fuel, air, hydrogen rich gas, and EGR (Exhaust Gas Recirculation) and includes a knock sensor.

Various embodiments of the present invention will now be described in conjunction with the figures of the drawing. With reference first to FIG. 1, a high compression ratio gasoline engine 10 receives fuel from a fuel tank 12 through a valve 14. Similarly, the engine 10 receives air through a valve 16 and receives hydrogen rich gas through a valve 18. Exhaust gas recirculation (EGR) is provided to the engine 10 through a valve 20. The valves 14, 16, 18 and 20 are under the control of an electronic control unit (ECU) 22. The ECU 22 receives an input from an operator by means of a pedal 24. The ECU 22 individually controls the valves 14, 16, 18 and 20 so as to be able to independently control the amount of fuel, air, hydrogen-rich gas and EGR introduced into the engine 10. A knock sensor 26 detects knock in the engine 10 and provides an input signal into the ECU 22. A 3-way catalyst 28 may be provided to reduce further emissions from the engine 10. The ECU 22 is programmed so that the engine 10 operates in the low and high power regimes as necessary as described earlier.

Figure 2:
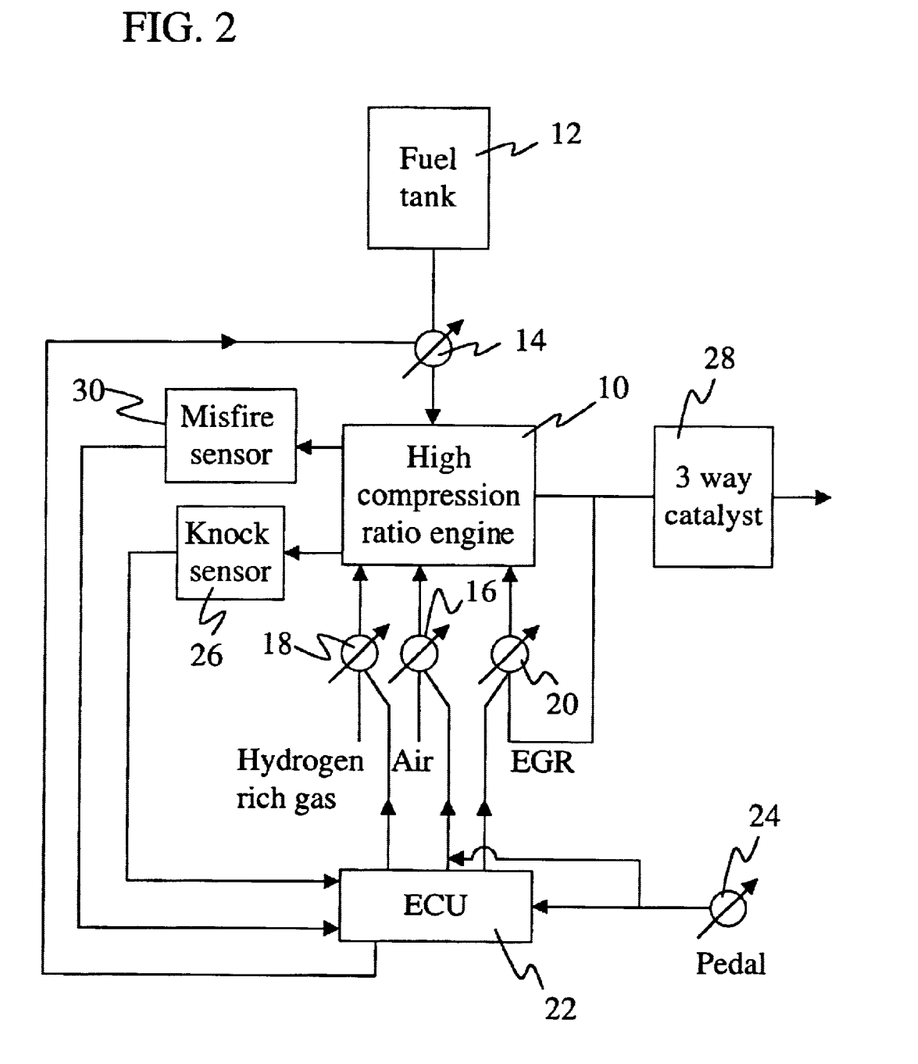
FIG. 2 is a schematic diagram similar to FIG. 1, but also includes a misfire sensor to determine conditions of misfire in the engine.

With reference now to FIG. 2, a misfire sensor 30 is added to the system shown in FIG. 1. The misfire sensor 30 detects misfire in the engine 10 and sends a signal to the ECU 22. As discussed above, the fuel/air ratio and/or the amount of hydrogen-rich gas and/or EGR introduced into the engine 10 is adjusted in response to the misfire sensor 30.

Figure 3:
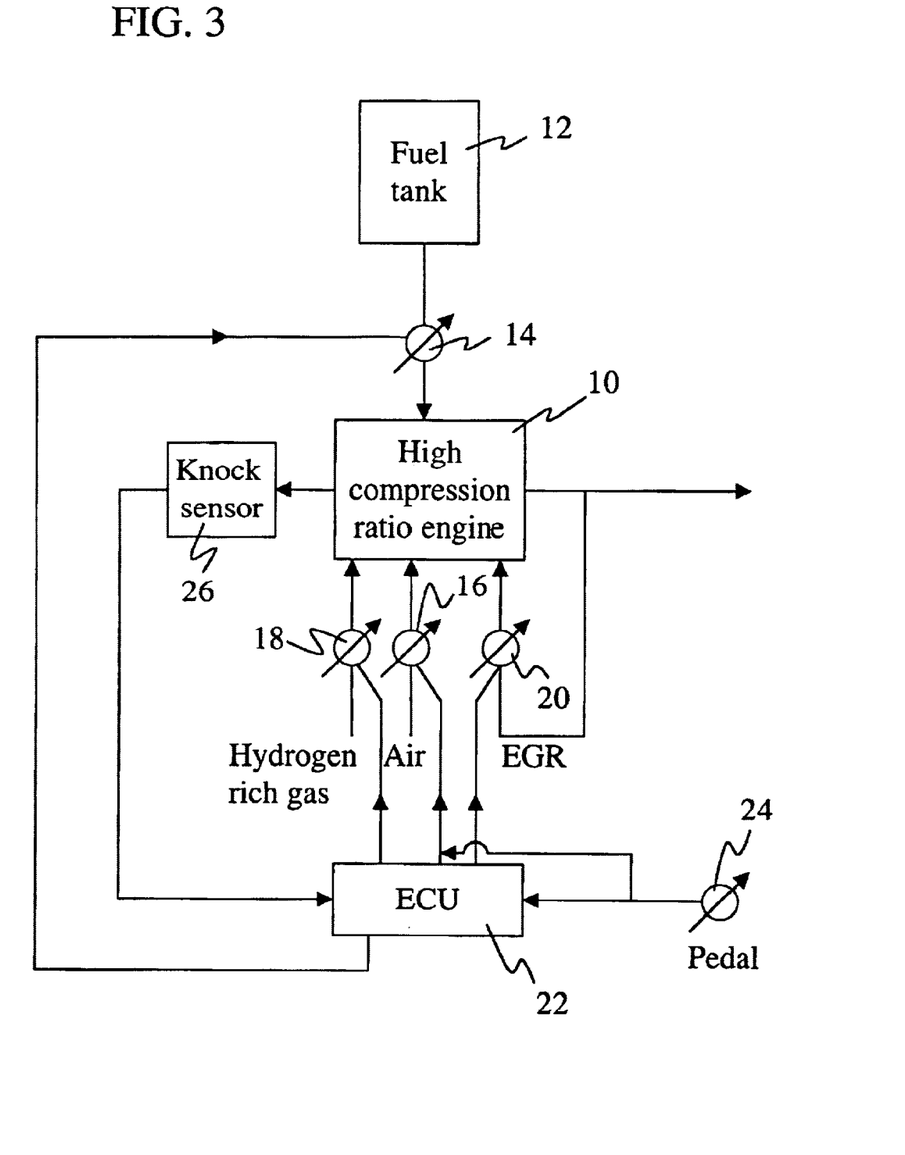
FIG. 3 is a schematic diagram of an embodiment of the invention without a 3-way exhaust aftertreatment catalyst.

The embodiment illustrated in FIG. 3 is similar to that in FIG. 1 but without a 3-way catalyst which can be unnecessary in some of the operational modes as discussed above.

Figure 4:
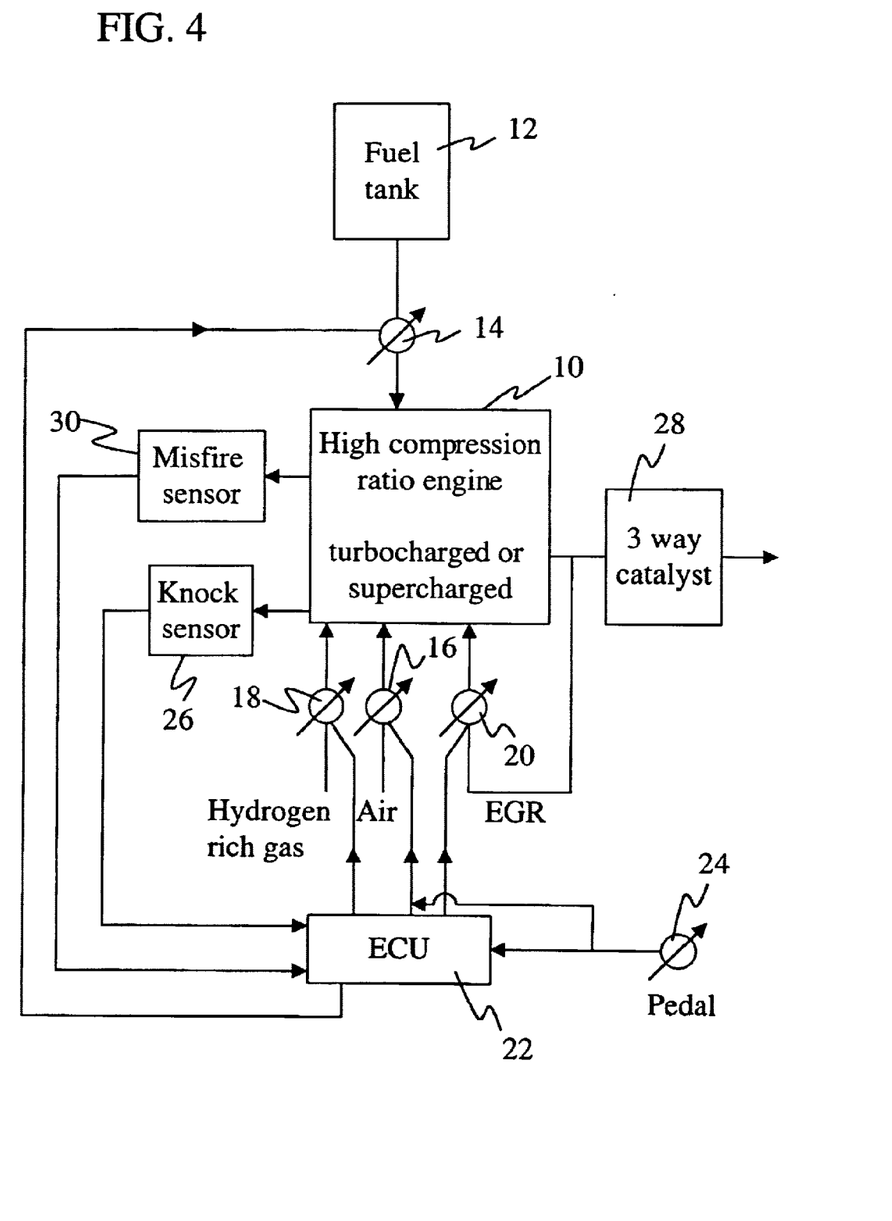
FIG. 4 is a schematic diagram of an embodiment with a boosted engine, either turbocharged or supercharged.

FIG. 4 is directed to an embodiment of the system of the invention in which the high compression ratio gasoline engine 10 may be boosted as by turbo charging or supercharging.

Figure 5:
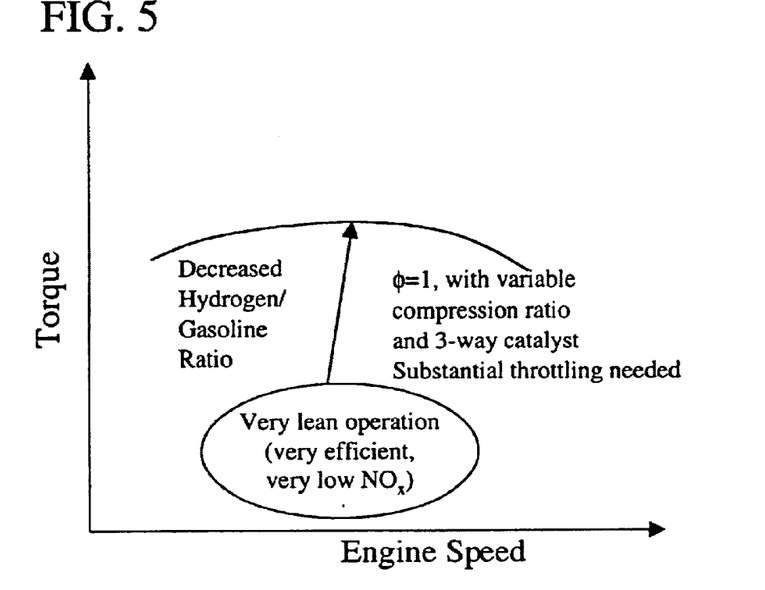
FIG. 5 is a graph showing lean burn engine operation characteristics as a function of torque and speed, for conditions without use of EGR at higher torque or power levels.
Figure 6:
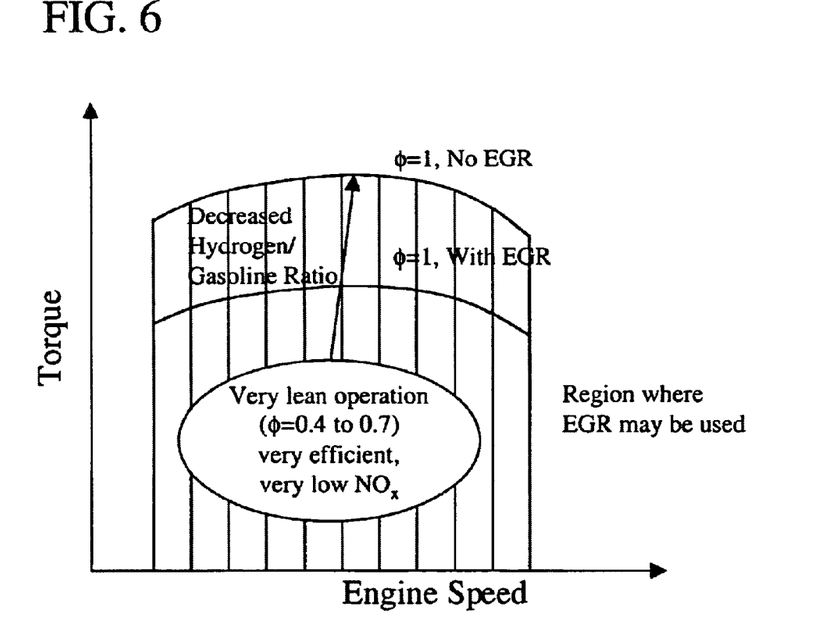
FIG. 6 is a graph showing lean burn engine operation characteristics as a function of torque and speed, for conditions with use of EGR at higher torque or power levels.

FIG. 5 illustrates how torque varies as a function of lean burn engine speed as the equivalence ratio is altered without the use of EGR at high power. Operation at $\phi=1$ is possible with variable compression ratio. The hydrogen/gasoline ratio is decreased at high values of torque and power. Substantial throttling may be needed. FIG. 6 is a similar graph utilizing EGR at high power. It illustrates very lean operation at lower power levels with stoichiometric operation ($\phi=1$) at high power with EGR used to avoid knock. Alternatively, variable compression ratio can be used to avoid knock obviating EGR at high power. FIG. 7 shows operation using the combination of lean fuel mixtures and EGR at all torque and power levels.

It is intended that all variations and modifications of the invention disclosed herein be included within the scope of the appended claims.

What is claimed is:

1. Internal combustion engine system comprising:
   an internal combustion gasoline engine having a compression ratio in the range of 11–16; and
   means for introducing into the engine fuel/air mixtures including an amount of hydrogen to substantially eliminate misfire at a first equivalence ratio in the range of 0.4–0.7 when the engine is operating below a selected torque or power level and introducing into the engine fuel/air mixtures in a second equivalence ratio range wherein the second equivalence ratio is greater than the first equivalence ratio when the engine is operated above the selected torque or power level, the second equivalence ratio being sufficiently low at substantially all times to prevent knock.

2. The system of claim 1, wherein the second equivalence ratio is above 0.7.

3. The system of claim 1, wherein the second equivalence ratio is below 0.7.

4. The system of claim 1, wherein at some time the first equivalence ratio is between 0.4 and 0.55 and the second equivalence ratio is between 0.6 and 0.8.

5. The system of claim 1, wherein at some time the equivalence ratio during operation above the selected power or torque level is as high as possible without the occurrence of knock.

6. The system of claim 1, wherein hydrogen may be introduced when the engine is operated above the selected power level.

7. The engine system of claim 1, further including means for introducing EGR into the engine.

8. The system of claim 1, wherein the engine has a variable compression ratio.

9. The system of claim 1, wherein the engine further includes means for increasing turbulence.

10. The system of claim 9, wherein the turbulence is introduced when the engine is operated above the selected torque or power level.

11. The system of claim 1, wherein the equivalence ratio may be either fixed or variable when the engine is operated below the selected power level.

12. The system of claim 1, wherein EGR is used in addition to lean operation above a selected torque or power level.

13. Internal combustion engine system comprising:
an internal combustion gasoline engine having a compression ratio in the range of 11–16; and
means for introducing into the engine EGR along with a stoichiometric fuel/air mixture including hydrogen sufficient to prevent misfire and wherein the amount of EGR is always sufficient to prevent knock.

14. The system of claim 13, wherein EGR levels are decreased from larger values at low power levels to the lowest level at which knock is avoided at high power levels.

15. The system of claim 13, further including a means for introducing additional turbulence within the engine.

16. The system of claim 13, further including a knock sensor for detecting knock in the engine.

17. The system of claim 13, wherein hydrogen is injected to be preferentially close to the spark plug.

18. The system of claim 13 wherein EGR levels are decreased from larger values at low power levels to smaller values at high power levels.

19. The system of claim 18 wherein turbulence is introduced when the engine is operated above a selected torque or power level.

20. The system of claim 13 wherein the engine has a variable compression ratio.

21. Internal combustion engine system comprising:
an internal combustion gasoline engine wherein the compression ratio is in the 11–16 range;
means for introducing into the engine fuel/air mixtures with an equivalence ratio of 0.4–0.7 along with an amount of hydrogen to substantially eliminate misfire, wherein the hydrogen is injected into the engine so as to be preferentially close to the spark plug.

22. The system of claim 21, wherein EGR is used in addition to lean operation with an equivalence ratio of 0.4–0.7.

23. Internal combustion gasoline engine system comprising:
an internal combustion gasoline engine having a compression ratio in the range of 11–16; and
means for introducing into the engine a varying fuel/air mixture along with a varying amount or fixed amount of EGR including hydrogen sufficient to prevent misfire and wherein the combination of the fuel/air mixture and EGR is always sufficient to prevent knock.

24. The system of claim 23, wherein the equivalence ratio is increased from low values at low torque and/or power levels to higher values at a higher torque and/or power levels.

25. The system of claim 24, wherein the equivalence ratio is increased to substantially a stoichiometric value at a selected value of torque or power.

26. The engine system of claim 23, wherein below a selected value of torque or power, NOx emissions from the engine are at least 97% below NOx emissions at stoichiometric fuel mixtures with no EGR.

27. The engine system of claim 26, wherein below the selected value of torque or power, NOx emissions from the engine are at least 99% below NOx emissions at stoichiometric fuel mixtures with no EGR.

28. The system of claim 23, further including a knock sensor for detecting knock in the engine.

29. The system of claim 23, wherein hydrogen is injected preferentially close to the spark plug.

30. The system of claim 23, wherein turbulence is introduced when the engine is operated above a selected torque or power level.

31. Internal combustion engine system comprising:
an internal combustion gasoline engine having a compression ratio in the range of 11–16; and
means for introducing into the engine fuel/air mixtures including an amount of hydrogen to substantially eliminate misfire at a first equivalence ratio in the range of 0.4–0.7 when the engine is operating below a selected torque or power level and introducing into the engine fuel/air mixtures in a second equivalence ratio wherein the second equivalence ratio is greater than the first equivalence ratio when the engine is operated above the selected torque or power level, the second equivalence ratio being sufficiently low at all times to prevent knock, and wherein the system further includes a knock sensor for detecting knock in the engine.

32. The system of claim 31, wherein the second equivalence ratio is above 0.7.

33. The system of claim 31, wherein the second equivalence ratio is below 0.7.

34. The system of claim 31, wherein the first equivalence ratio is between 0.4 and 0.55 and the second equivalence ratio is between 0.6 and 0.8.

35. The system of claim 31, wherein at some time the equivalence ratio during operation above the selected power torque level is as high as possible without the occurrence of knock.

36. The system of claim 31, wherein hydrogen may be introduced when the engine is operated above the selected power level.

37. The system of claim 31, further including means for introducing EGR into the engine.

38. The system of claim 31, wherein the engine has a variable compression ratio.

39. The system of claim 31, wherein the engine further includes means for increasing turbulence.

40. The system of claim 39, wherein the turbulence is introduced when the engine is operated above the selected power level.

41. The system of claim 31, wherein the equivalence ratio may be either fixed or variable when the engine is operated below the selected power level.

42. The system of claim 31, wherein EGR is used above a selected torque or power level.

* * * * *